US007661441B2

(12) United States Patent
Simensen et al.

(10) Patent No.: US 7,661,441 B2
(45) Date of Patent: Feb. 16, 2010

(54) MULTI-LINE FLUID CONDUIT MODULES

(76) Inventors: Thomas O. Simensen, 158 Crestline Ave., Kalispell, MT (US) 59901; Torbjorn O. Simensen, 158 Crestline Ave., Kalispell, MT (US) 59901

( * ) Notice: Subject to any disclaimer, the term of this patent is extended or adjusted under 35 U.S.C. 154(b) by 0 days.

(21) Appl. No.: 10/851,261

(22) Filed: May 21, 2004

(65) Prior Publication Data

US 2005/0257843 A1 Nov. 24, 2005

(51) Int. Cl.
*F16K 11/10* (2006.01)

(52) U.S. Cl. ...................................... 137/884; 137/269

(58) Field of Classification Search ................. 137/884, 137/269

See application file for complete search history.

(56) References Cited

U.S. PATENT DOCUMENTS

| | | | | |
|---|---|---|---|---|
| 3,654,960 | A * | 4/1972 | Kiernan | 137/884 |
| 4,167,200 | A * | 9/1979 | Bouteille | 137/884 |
| H239 | H | 3/1987 | Franklin et al. | |
| 4,770,341 | A | 9/1988 | Drake | |
| 4,907,739 | A | 3/1990 | Drake | |
| 4,949,757 | A * | 8/1990 | Lashta | 137/884 |
| 5,390,660 | A | 2/1995 | Danielson | |
| 6,345,770 | B1 * | 2/2002 | Simensen | 237/69 |
| 6,729,364 | B2 * | 5/2004 | Few et al. | 137/884 |
| 2004/0262412 | A1 * | 12/2004 | Sweet | 237/16 |

* cited by examiner

*Primary Examiner*—John Fox
(74) *Attorney, Agent, or Firm*—Husch Blackwell Sanders LLP

(57) ABSTRACT

A modular manifold component for hydronic circulation systems includes a control conduit section adapted and constructed to receive any of a plurality of selectively actuatable fluid control mechanisms. The control conduit section has an inlet and an outlet. A return conduit section is secured to the control conduit section in fluid communication with the inlet of the control conduit section. A supply conduit section is secured to the control conduit section in fluid communication with the inlet of the control conduit section.

14 Claims, 3 Drawing Sheets

MULTI-LINE FLUID CONDUIT MODULES

FIELD OF THE INVENTION

The invention relates generally to components for systems having fluid conduits. Specifically, the invention relates to modular fluid control components finding particular utility in hydronic heating systems.

BACKGROUND OF THE INVENTION

The practice of controlling the temperature of a building by circulating water has been known since the times of the Roman Empire. Archeological reconstruction has revealed that bath houses often used wood-fired boilers to heat water. The hot water was then used not only in the bath itself, but was as well circulated in sub-floor conduits to heat the floor of the bath house.

Modern hydronic systems, although based on the same concept, incorporate heating, circulation, and control arrangements that would have been unimaginable to the ancients. For example, U.S. Pat. No. 5,390,660 to Danielson is directed to a pre-wired and pre-plumbed module for connection to an installed hydronic radiant floor heating system including a supporting frame having components mounted thereon such as a boiler, pumps, four-way valve, in-line air separator, expansion tank, P/T ports, return valves, supply valves and control panels mounted thereon. The module is assembled at the factory and is tested at the factory to ensure that the components are properly plumbed and wired. Once the module is delivered to the job site, the components of the module are quickly and easily connected to the hydronic radiant floor heating system.

U.S. Pat. No. 4,907,739 to Drake discusses a radiant heating system especially useful for floor heating is provided with a fluid flow apparatus that includes means for pumping a fluid such as water, a temperature-responsive actuator and a valve positionable within a valve housing in response to measured fluid temperature. The system includes heat transfer means, typically a tube embedded in the floor that receives heated fluid from the flow apparatus which in turn receives fluid at generally a higher temperature from a fluid heating apparatus such as a water boiler. The amount of heated fluid recirculated to the heat transfer means is controlled by the position of the valve in the valve housing.

U.S. Pat. No. 4,770,341 to Drake sets forth a manifold which is useful in receiving a heated liquid such as warm water from a suitable source and for distributing that liquid to a plurality of floor heat exchangers and for receiving liquid from the heat and returning that liquid to the source. The manifold includes a plurality of separate manifold elements that can be stacked adjacent one another, each element having a first and second chamber. The first and second chambers of the elements together define first and second distribution vessels within the manifold. Each manifold element includes inlet and outlet ports communicating with the respective distribution vessels for carrying liquid to and from the heat exchangers. The manifold elements desirably are integrally formed from plastic or other material exhibiting a coefficient thermal conductivity of less than 1.0 kcal/M h° C.

U.S. Pat. No. H239 to Franklin is directed to a hydronic heating system that includes a tube or series of tubes placed on modular composite panels. The panels are fabricated with a grooved surface to permit the flush embedment of the tubes on the panels.

U.S. Pat. No. 6,345,770 to Simensen, the specification of which is incorporated by reference herein, discusses a modular manifold adapted for use with hydronic circulation systems including a plurality of first and second thermal exchange zones having respective zone supply and zone return lines. The modular manifold includes a plurality of modules, each of which includes a selectively actuatable fluid control mechanism having an inlet and an outlet. The outlet of each selectively actuatable fluid control mechanism is in fluid communication with a respective zone supply line of the zone of the hydronic circulation system. Each module further includes a common return conduit section secured to the selectively actuatable fluid control mechanism. A common supply conduit section is secured to the selectively actuatable fluid control mechanism of each module. The common supply conduit section is in fluid communication with the inlet of the selectively actuatable fluid control mechanism, The modules are adapted and constructed to be connected together, with the collective common return conduit sections fitting together to form a common return conduit in communication with the return lines of the thermal exchange zones, and the collective common supply conduit sections fitting together to form a common supply conduit. The selectively actuatable fluid control mechanisms can be provided as any suitable control mechanism, such as zone pumps or zone valves. A connecting conduit having a first end connected to the common return conduit and a second end connected to the common supply conduit can be provided in the form of a U-bend. An injection mechanism having an inlet connected to a source of thermal exchange fluid and an outlet connected to the connecting conduit can also be provided. The injection mechanism can be provided as an injection pump or an injection mixing valve. A temperature gauge can be connected to the connecting conduit at a location downstream from the injection mechanism outlet. The temperature gauge indicates the temperature of fluid flowing into the common supply conduit. Tee connectors can be provided to connect the modules together, and can include a return inlet conduit connected to the zone return line of the first thermal exchange zone.

Although these arrangements offer some advantages over standard heating and cooling systems, many are complex and expensive. Even the most advanced modular systems require special castings or other adaptations to mount standard flow control mechanisms. It can be seen from the foregoing that the need exists for a simple, inexpensive modular manifold system that provides fabrication and installation advantages, overcoming the deficiencies of known arrangements.

SUMMARY OF THE INVENTION

These and other objects are achieved by providing a modular manifold component for hydronic circulation systems including a control conduit section adapted and constructed to receive any of a plurality of selectively actuatable fluid control mechanisms. The control conduit section has an inlet and an outlet. A return conduit section is secured to the control conduit section in fluid communication with the inlet of the control conduit section. A supply conduit section is secured to the control conduit section in fluid communication with the inlet of the control conduit section.

The features of the invention believed to be patentable are set forth with particularity in the appended claims. The invention itself, however, both as to organization and method of operation, together with further objects and advantages thereof, may best be understood by reference to the following description, taken in conjunction with the following drawings.

DETAILED DESCRIPTION OF THE INVENTION

Figure 1:
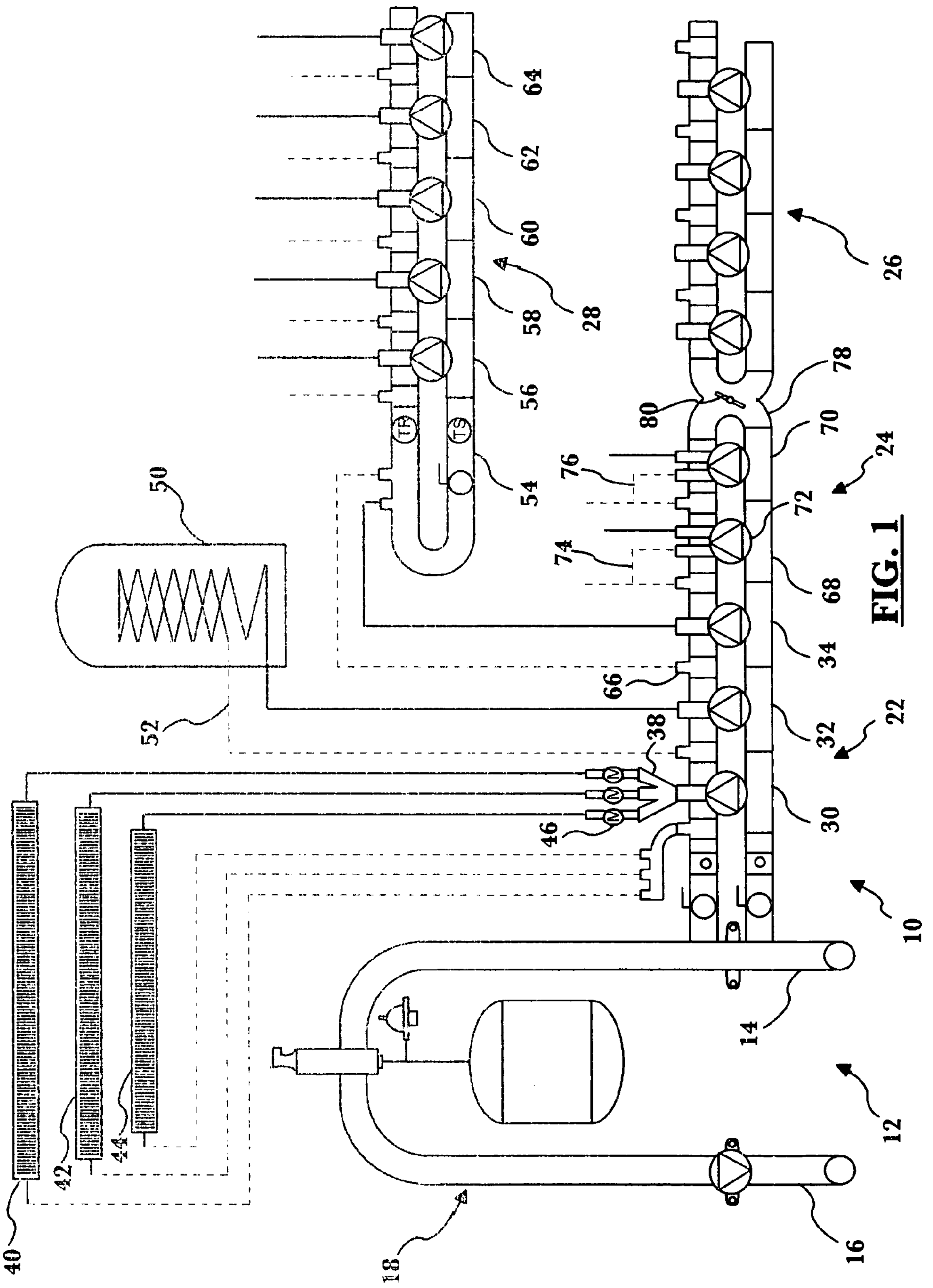
FIG. 1 is a schematic diagram of a modular manifold system embodying the principles of the present invention.

FIG. 1 illustrates a system 10 incorporating modules embodying the principles of the present invention. The system 10 includes a primary loop module 12 having a boiler supply connection 14, a boiler return connection 16, and an expansion section 18. The primary loop module 12 provides connections from the boiler (not shown) to the heat exchange module groups 22-28, and from the heat exchange module groups 22-28 back to the boiler.

A first heat exchange module group 22 includes a plurality of high-temperature modules 30, 32, 34. The high-temperature modules typically provide heat exchange medium (such as fluid) at a temperature of around 180 degrees. A baseboard zone module 30 employs a multi-conduit supply manifold 38 to supply heat exchange medium to a plurality of baseboard zones 40, 42, and 44. Each branch of the supply manifold 38 is provided with a motorized valve 46, which can be used to control the flow of heat exchange medium to the respective baseboard zone. Heat exchange medium is returned to the boiler return connection via a return manifold 48. The second high-temperature module 32 supplies heat exchange medium to a domestic hot water maker 50, from which heat exchange medium is returned to the boiler return connection via a return connection 52. The third high-temperature module 34 supplies heat exchange medium at a variable rate to a secondary heat exchange module group 28, which employs an injection module 54 to supply heat exchange medium to a plurality of mixed temperature modules 54-64. These modules can be used to further expand the capabilities of the system 10 by providing an additional set of varying zones, which may be high, low, or medium temperatures. Heat exchange medium is returned to the boiler return connection via a return connection 66.

A second heat exchange module group 24 includes a plurality of three-way mixing modules 68, 70. The mixing modules 68, 70 are provided with mixing valves 72, which are connected with the supply line, but also the return line via a connection 74. A thermostat within the mixing valve 72, which may be used with a remotely-mounted sensor, permits custom setting and maintenance of any desired temperature to be provided to the supply line 76.

A 4-way mixing module 78 connects the main supply and return lines. The mixing module 78 is provided with a pivoting regulator 80 used to control the temperature mix to the downstream modules, here shown as the second mixed-temperature module group 26. The temperature of the heat exchange fluid provided by the mixing module 78 is controlled by a thermostat, in a known manner.

Figure 2:
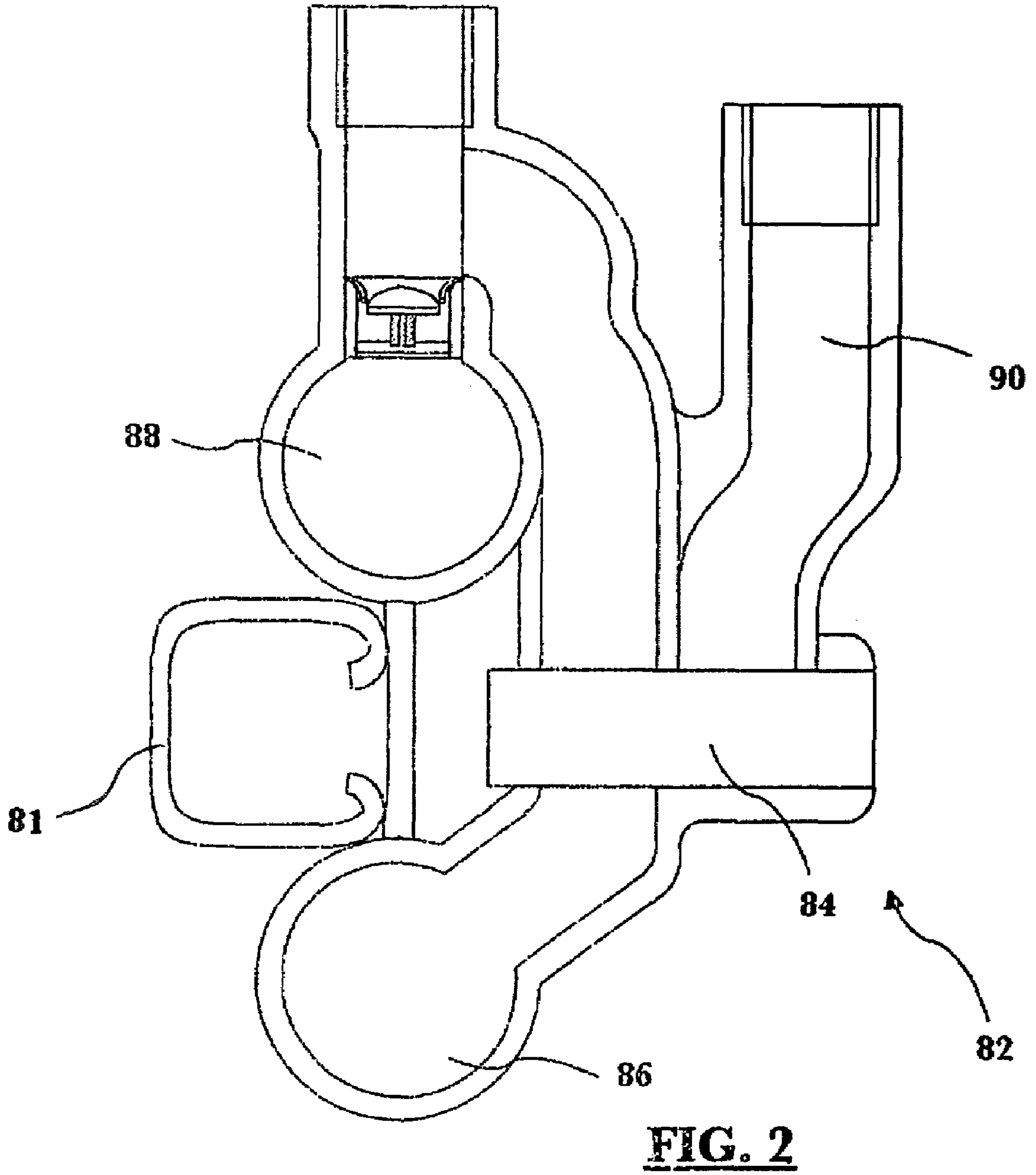
FIG. 2 a schematic diagram of a modular manifold component embodying the principles of the present invention.

One example of an embodiment of a modular manifold component is shown in FIG. 2. The modular manifold component 80 includes a control conduit section 82 adapted and constructed to receive any of a plurality of selectively actuatable fluid control mechanisms. Such selectively actuatable fluid control mechanisms can include mixing valves, injection valves, check valves, isolation valves, and the like. In the illustrated embodiment, the control conduit section 82 is adapted to receive a mixing valve, such as the VC6800 manufactured by Honeywell. The control conduit section 82 has an inlet 84 connected to a supply conduit section 86 and to a return conduit section 88.

The control conduit section also an outlet section 90 adapted and constructed to receive any of a plurality of selectively actuatable fluid control mechanisms, such as check valves, isolation valves, mixing valves, circulators, zone valves, and the like.

The adaptability of the modular manifold component 80 to a variety of flow control components gives it a versatility that enables its use in a variety of applications. For example, with a mixing valve connected to the control conduit section, the modular manifold component 80 can be used as a mixing modules as illustrated by the modules 68 and 70 in FIG. 1. With a multi-conduit manifold at its outlet, the modular manifold component 80 can be fitted as high-temperature module 30 in FIG. 1. With a pump fitted to the control conduit section, the modular manifold component 80 can be used in the same manner as a conventional zone supply unit, as with high-temperature module 30 in FIG. 1.

The modular manifold component 80 is shown as a cast unit, which can be fabricated from tradition materials such as iron or brass, or with composite or plastic materials. It is also contemplated that the modular manifold component 80 can be fabricated by brazing conventional brass or copper conduit and fitting sections together.

Figure 3:
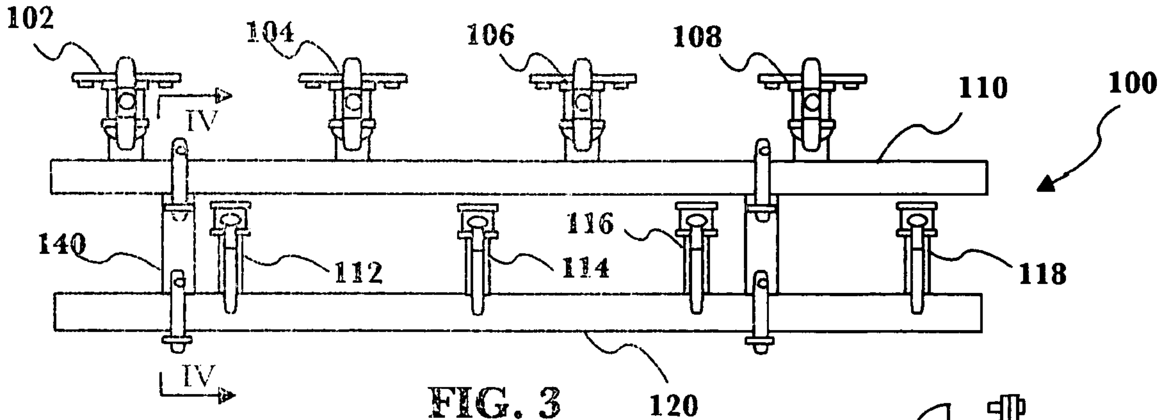
FIG. 3 a schematic diagram of another modular manifold component embodying the principles of the present invention.
Figure 4:
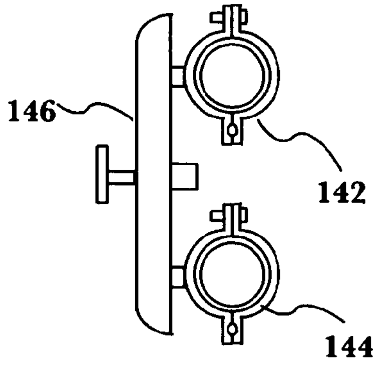
FIG. 4 a schematic sectional view taken generally along lines IV-IV of FIG. 3.
Figure 5:
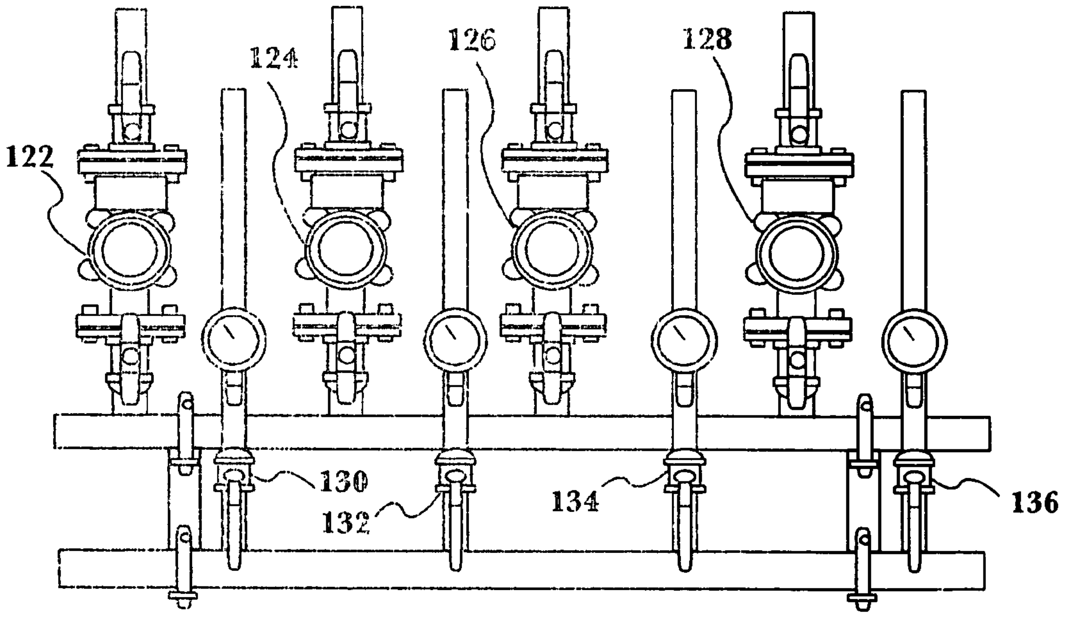
FIG. 5 a schematic diagram of the FIG. 3 modular manifold component with flow control mechanisms in place.

Another embodiment of a modular manifold in accordance with the principles of the present invention is shown in FIGS. 3 through 5. In this embodiment, the modular manifold 100 includes a plurality of control conduit sections 102-108 adapted and constructed to receive any of a plurality of selectively actuatable fluid control mechanisms. Such selectively actuatable fluid control mechanisms can include mixing valves, injection valves, check valves, isolation valves, and the like. Each of the control conduit sections 102-108 has an inlet connected to a supply conduit section 110. A plurality of additional control conduit sections 112-118 are connected to a return conduit section 120.

The modular manifold 100 can accept any of a plurality of selectively actuatable fluid control mechanisms. As shown in FIG. 5, pumps 122-128 are connected to the control conduit sections 102-108, and valves 130-138 are connected to control conduit sections 112-118. The supply conduit section 110 and the return conduit section 120 are secured together via a conduit bracket 140, as shown in FIG. 4. The conduit bracket 140 includes respective clamps 142, 144 connected by a central casting 146. The conduit bracket 140 is adapted and constructed to secure the manifold 100 to a standard attachment mechanism 81, such as a uni-strut. Particular advantage can be attained when the modular manifold 100, or any manifold constructed in accordance with the principles of the present invention, is used in conjunction with a stand for modular hydronic systems, as described in, filed concurrently herewith, and which is incorporated herein in its entirety.

What is claimed is:

1. A modular manifold component far hydronic circulation systems, the component comprising the following:

a control conduit section adapted and constructed to receive a selectively actuatable fluid control mechanism selected from a group consisting of mixing valves, injection valves, check valves, isolation valves, circulators and zone valves , the control conduit section having an inlet and an outlet;

a return conduit section secured to the control conduit section in fluid communication with the inlet of the control conduit section;

a supply conduit section secured to the control conduit section in fluid communication with the inlet of the control conduit section, and wherein the control conduit section further comprises an outlet section adapted and constructed to selectively receive the selectively actuable fluid control mechanism via at least one of an upper and a lower receiving end of the outlet of the control conduit section.

2. A modular manifold component in accordance with claim 1, wherein the control conduit section further comprises a mixing section adapted and constructed to receive a mixing valve.

3. A modular manifold component in accordance with claim 1, further comprising a modular attachment mechanism secured to the conduit sections.

4. A modular manifold component in accordance with claim 1, further comprising a multi-conduit routing manifold secured to an outlet end of the supply conduit section.

5. A modular manifold component in accordance with claim 1, wherein the selectively actuable fluid control mechanism is a three way mixing valve.

6. A modular hydronic circulation system comprising the following:

a first modular component including a control conduit section having an outlet adapted and constructed to selectively receive a selectively actuatable fluid control mechanism selected from a group consisting of mixing valves, injection valves, check valves, isolation valves, circulators and zone valves, via at least one of an upper and a lower receiving end of the outlet of the control conduit section. the control conduit section having an inlet, a return conduit section secured to the control conduit section in fluid communication with the inlet of the control conduit section, and a supply conduit section secured to the control conduit section in fluid communication with the inlet of the control conduit section;

a second modular component including a control conduit section having an outlet adapted and constructed to selectively receive a selectively actuatable fluid control mechanism selected from a group consisting of mixing valves, injection valves, check valves, isolation valves, circulators and zone valves, via at least one of an upper and a lower receiving end of the outlet of the control conduit section. the control conduit section having an inlet, a return conduit section secured to the control conduit section in fluid communication with the inlet of the control conduit section, and a supply conduit section secured to the control conduit section in fluid communication with the inlet of the control conduit section; and connection means for connecting the first module to the second module.

7. A modular hydronic circulation system in accordance with claim 6, wherein the control conduit sections of the first and second modules each further comprise respective mixing sections adapted and constructed to receive respective mixing valves.

8. A modular hydronic circulation system in accordance with claim 6, wherein the same type of selectively actuatable fluid control mechanism is associated with the respective control conduit sections of the first and second modules.

9. A modular hydronic circulation system in accordance with claim 6, wherein a different type of selectively actuatable fluid control mechanism is associated with the respective control conduit sections of the first and second modules.

10. A modular hydronic circulation system in accordance with claim 6, further comprising a modular attachment mechanism secured to the control conduit sections of the first and second modular.

11. A modular hydronic circulation system in accordance with claim 10, wherein the modular attachment mechanism comprises a channel member connect on.

12. A modular manifold for hydronic systems, the manifold comprising the following:

a supply conduit section;

a return conduit section;

a plurality of first control conduit sections adapted and constructed to selectively receive a selectively actuatable fluid control mechanism selected from a group consisting of mixing valves, injection valves, check valves, isolation valves, circulators and zone valves, each of the first control conduit sections having an inlet connected to the supply conduit section;

a plurality of second control conduit sections adapted and constructed to selectively receive a selectively actuatable fluid control mechanism selected from a group consisting of mixing valves, injection valves, check valves, isolation valves, circulators and zone valves, via at least one of a top and a bottom of an outlet of the plurality of second control conduit sections, each of the second control conduit sections having an inlet connected to the return conduit section; and at least one conduit bracket connecting the supply conduit section to the return conduit section, the conduit bracket being adapted and constructed to secure the manifold to a standard attachment mechanism.

13. A modular manifold in accordance with claim 12, wherein the at least one conduit bracket is adapted and constructed to secure the manifold to a channel member.

14. A modular manifold in accordance with claim 12, wherein the at least one conduit bracket comprises a plurality of conduit brackets.

* * * * *